US010863353B2

(12) United States Patent
Ainali et al.

(10) Patent No.: US 10,863,353 B2
(45) Date of Patent: Dec. 8, 2020

(54) METHOD AND ARRANGEMENT FOR DETECTING SUBSCRIBER IDENTITY

(71) Applicant: EXFO Oy, Oulu (FI)

(72) Inventors: Timo Ainali, Oulu (FI); Jorma Ikäheimo, Oulu (FI); Tuure Mäkelä, Oulu (FI); Taisto Niiranen, Ii (FI)

(73) Assignee: EXFO OY, Oulu (FI)

( * ) Notice: Subject to any disclaimer, the term of this patent is extended or adjusted under 35 U.S.C. 154(b) by 0 days.

(21) Appl. No.: 16/420,981

(22) Filed: May 23, 2019

(65) Prior Publication Data
US 2019/0364430 A1 Nov. 28, 2019

(30) Foreign Application Priority Data
May 23, 2018 (EP) .................... 18173821

(51) Int. Cl.
H04W 12/06 (2009.01)
H04W 12/00 (2009.01)
H04W 8/20 (2009.01)

(52) U.S. Cl.
CPC ......... *H04W 12/0602* (2019.01); *H04W 8/20* (2013.01); *H04W 12/001* (2019.01); *H04W 12/004* (2019.01); *H04W 12/00514* (2019.01)

(58) Field of Classification Search
CPC ... H04M 1/17; H04W 12/001; H04W 12/004; H04W 12/00514; H04W 12/0602; H04W 8/20
USPC ...................... 455/436–439, 556.1
See application file for complete search history.

(56) References Cited

U.S. PATENT DOCUMENTS

| 10,368,239 | B2* | 7/2019 | Jover | H04W 12/02 |
|---|---|---|---|---|
| 2010/0267373 | A1* | 10/2010 | Engstrom | H04J 11/0093 455/415 |
| 2016/0295432 | A1* | 10/2016 | Tang | H04L 43/10 |
| 2017/0206351 | A1* | 7/2017 | Jay | G06F 21/552 |
| 2017/0366388 | A1* | 12/2017 | Begeer | H04W 88/10 |
| 2018/0232533 | A1* | 8/2018 | Egorov | G06F 21/6227 |
| 2018/0367978 | A1* | 12/2018 | Targali | H04W 8/06 |
| 2018/0367998 | A1* | 12/2018 | Kunz | H04W 12/12 |
| 2019/0068651 | A1* | 2/2019 | Briggs | H04W 12/00508 |
| 2019/0110205 | A1* | 4/2019 | Shaik | H04W 12/12 |

(Continued)

FOREIGN PATENT DOCUMENTS

EP 3208990 A1 8/2017

OTHER PUBLICATIONS

Extended European Search Report issued in corresponding European Patent Application No. 18173821.2, 2 pages (dated Sep. 10, 2018).

(Continued)

*Primary Examiner* — Congvan Tran
(74) *Attorney, Agent, or Firm* — Buchanan Ingersoll & Rooney PC

(57) ABSTRACT

Method and arrangement for detecting subscriber identity. The method includes: capturing in a fake base station at least one wireless message transmitted from a mobile subscriber apparatus interoperable with a mobile phone system; detecting an encrypted subscriber identity from the at least one captured wireless message; and retrieving an unencrypted subscriber identity from an entity inside an infrastructure of the mobile phone system based on the encrypted subscriber identity.

16 Claims, 2 Drawing Sheets

(56) References Cited

U.S. PATENT DOCUMENTS

2019/0268759 A1* 8/2019 Targali .................... H04W 8/26
2019/0349765 A1* 11/2019 Kolekar ................ H04W 12/12

OTHER PUBLICATIONS

Unknown, "Security architecture and procedures for 5G system (Release 15); 3GPP TS 33.501 VI5.0.0",3rd Generation Partnership Project (3GPP) Standard, pp. 1-128, (Mar. 26, 2018).
Unknown, "Technical Realization of Service Based Architecture; Stage 3 (Release 15); 3GPP TS 29.500 V1.1.0", 3rd Generation Partnership Project (3GPP) Standard, pp. 1-23, (Apr. 2018).
Unknown, Non-Access-Stratum (NAS) protocol for 5G System (5GS); Stage 3 (Release 15); 3GPP TS 24.501 V1.1.1, 3rd Generation Partnership Project (3GPP) Standard, pp. 1-290, (May 2018).

* cited by examiner

METHOD AND ARRANGEMENT FOR DETECTING SUBSCRIBER IDENTITY

FIELD

The invention relates to a method, and to an arrangement comprising a fake base station and an entity inside an infrastructure of a mobile phone system.

BACKGROUND

A fake station is used to detect a subscriber identity. This procedure may be called IMSI catching. However, in recent mobile phone systems the subscriber identity is encrypted, whereby traditional detection methods do not work.

BRIEF DESCRIPTION

The present invention seeks to provide an improved method and an improved arrangement.

According to an aspect of the present invention, there is provided a method as specified in claim 1.

According to another aspect of the present invention, there is provided an arrangement as specified in claim 8.

LIST OF DRAWINGS

Example embodiments of the present invention are described below, by way of example only, with reference to the accompanying drawings, in which FIG. 1 illustrates example embodiments of a method;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
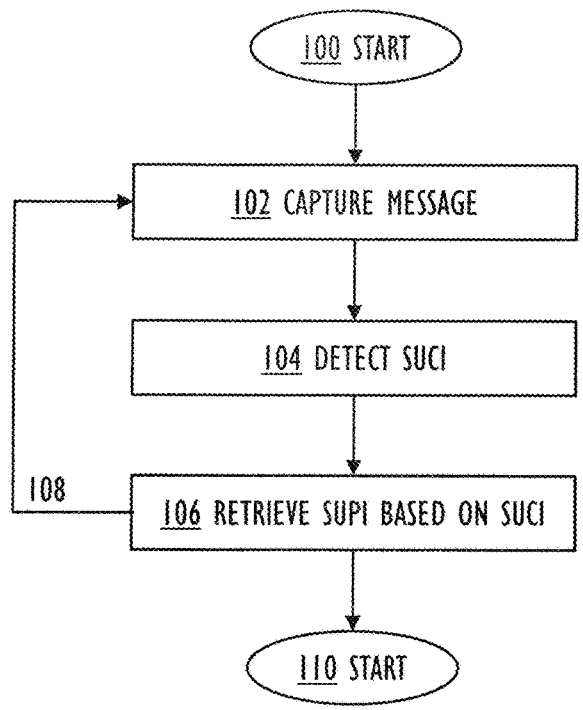

Let us first study FIG. 1 illustrating example embodiments of a method.

The method starts in 100.

In 102, at least one wireless message transmitted from a mobile subscriber apparatus interoperable with a mobile phone system is captured in a fake base station.

In 104, an encrypted subscriber identity from the at least one captured wireless message is detected.

In 106, an unencrypted subscriber identity is retrieved from an entity inside an infrastructure of the mobile phone system based on the encrypted subscriber identity.

The method ends in 110 after the processing is finished, or, the method may loop 108 back to the operation 102 to receive further messages from the same mobile subscriber apparatus as before, or from some other mobile apparatus.

Figure 2:
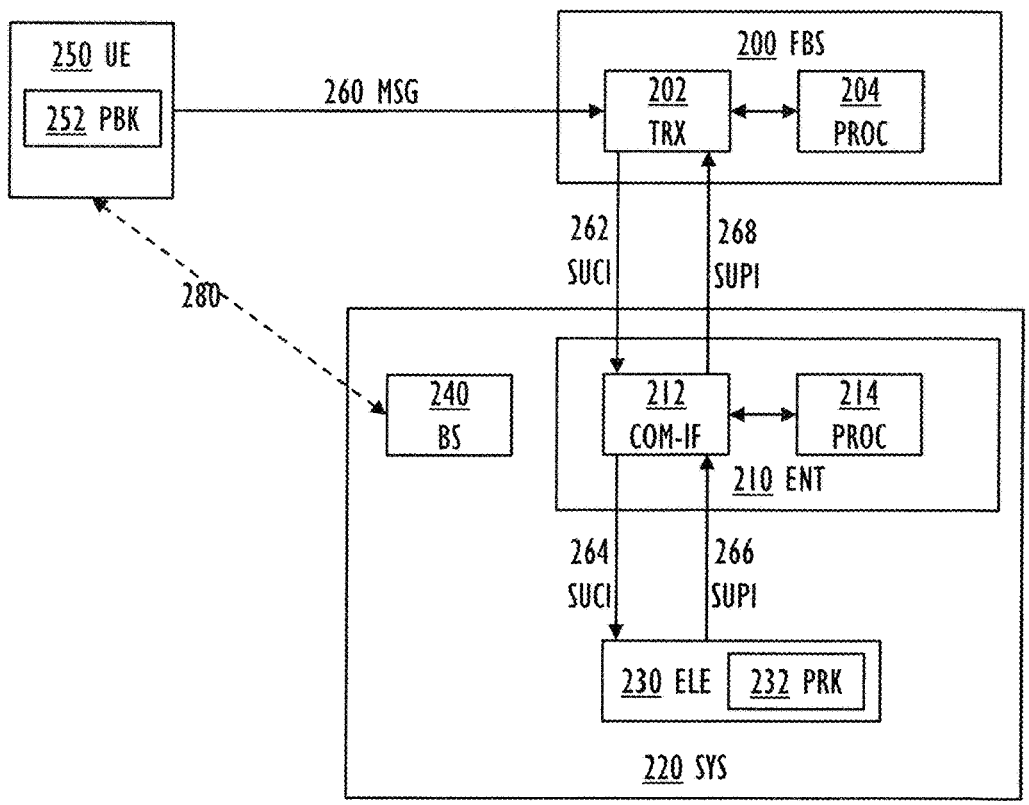
FIG. 2 illustrates example embodiments of an arrangement.

Let us next study FIG. 2 illustrating example embodiments of an arrangement with which the method may be implemented.

The arrangement comprises the fake base station 200, and the entity 210 inside the infrastructure of the mobile phone system 220.

The fake base station 200 comprises one or more processing units 204 and one or more radio transceivers 202. These parts 202, 204 are configured to implement communication and processing required by the method. Consequently, the parts 202, 204 are configured to capture 102 the at least one wireless message 260 from the mobile subscriber apparatus 250, to detect 104 the encrypted subscriber identity from the at least one captured wireless message 260, and to transmit the encrypted subscriber identity 262 to the entity 210.

The one or more radio transceivers 202 may be implemented with a software-defined radio (SDR) technology. With SDR technology, the one or more radio transceivers 202 contain the required radio frequency parts (for example: an antenna, a low-noise amplifier, band-pass filters, an analog-to-digital converter), but at least some of the traditional hardware components, especially those used for digital signal processing, are implemented with radio interface software running on a processing unit. Described one or more processing units 204 may run the radio interface software, or, alternatively, there may be dedicated processors (not illustrated in FIG. 1) coupled with the one or more radio transceivers 204 for running the radio interface software.

The one or more processing units 204 may be implemented with one or more processors (such as a microprocessor) and computer program code (software), or as an application-specific integrated circuit (ASIC), or as any other way of implementing a device that is capable of processing data.

The entity 210 comprises one or more processing units 214 and one or more communication interfaces 212. These parts 212, 214 are configured to implement communication and processing required by the method. Consequently, the parts 212, 214 are configured to receive the encrypted subscriber identity 262 from the fake base station 200, to retrieve 106 the unencrypted subscriber identity 266 from a network element 230 of the mobile phone system 220 based on the encrypted subscriber identity 264, and to transmit the unencrypted subscriber identity 268 to the fake base station 200.

The entity 210 may be implemented as a networked server apparatus. The fake base station 200 and the networked server apparatus 210 may operate according to a client-server architecture, a cloud computing architecture, a peer-to-peer system, or another applicable computing architecture. The one or more communication interfaces 212 may be implemented with appropriate wired/wireless communication technologies and standard/proprietary protocols.

The fake base station 200 may also be called a false base station, or a stand-alone control apparatus out of the mobile phone system 220. 'Fake' refers to the fact that the fake base station 200 is not a part of the (real) mobile phone system 220 and it does not provide continuous service for the mobile subscriber apparatuses 250 and their users. The purpose of the fake base station 200 is to perform radio interface functions required for finding out the subscriber identity associated with the mobile subscriber apparatus 250. FIG. 2 also illustrates that the mobile subscriber apparatus 250 is interoperable with the real mobile phone system 220, i.e., the mobile subscriber apparatus 250 could gain service 280 from the real mobile phone system 220 (but the fake base station 200 overrides this, at least momentarily, so that one or messages may be captured 102).

As the subscriber identity is encrypted, the fake base station 200 alone cannot find out its real identity. Therefore, help from the mobile phone system 220 is required. But, as the mobile phone system 220 is strongly protected, a suitable interface is required. The entity 210 is allowed to operate inside the infrastructure of the mobile phone system 220, whereby it may access the network element 230 of the mobile phone system 220.

Naturally, the entity 210 is also strongly protected: the fake base station 200 may only access the entity 210 through an access control system (with a user identifier, a password, and a communication tunnel with a strong encryption, for example).

The subscriber identity may be tied to a subscriber identity module (SIM), which may be integrated circuit placed in a reader of the mobile subscriber apparatus 250, or it may be an embedded SIM, or even a software SIM is envisaged.

In an example embodiment, the encrypted subscriber identity 262, 264 comprises a Subscription Concealed Identifier (sometimes known as SUCI).

In an example embodiment, the unencrypted subscriber identity 266, 268 comprises a Subscription Permanent Identifier (sometime known as SUPI).

In an example embodiment, the encrypted subscriber identity has been encrypted with a public-key cryptography, also known as asymmetric cryptography, which uses a pair of keys: a public key 252, which is known by the mobile subscriber apparatus 250, and a private key 232, which is only known by the network element 230.

The at least one wireless message, which is transmitted from the mobile subscriber apparatus and captured by the fake base station 200, contains the subscriber identity encrypted with the public key 252. Only the paired private key holder, i.e., the network element 230, is able to decrypt the encrypted subscriber identity with the private key 232.

Consequently, the fake base station, 200, aided by the entity 210, is configured to communicate with the system element 230 of the mobile phone system 220 possessing the private key 232 of the public-key cryptography for decrypting the encrypted subscriber identity 264.

In an example embodiment, the encrypted subscriber identity is obtained 102 from the one or messages (Registration request, accept, De-registration request, Service Request, Configuration update command, Identity response), which may be according to the 3GPP standard 3GPP TS 24.501 (3rd Generation Partnership Project; Technical Specification Group Core Network and Terminals; Non-Access-Stratum (NAS) protocol for 5G System (5GS)), incorporated herein by reference in those jurisdictions where applicable.

In some cases, the fake base station 200 is configured to first receive one or more messages 260 from the mobile subscriber apparatus 250, which contain 5G-GUTI (5G Globally Unique Temporary Identity) or its shortened version 5G-S-TMSI (5G S-Temporary Mobile Subscriber Identity). But, as this is a temporary identity, further operations are required. Consequently, the fake base station 200 is configured to respond with a Identity request (SUCI), which causes the mobile subscriber apparatus 250 to respond 260 with a Identity response (SUCI), which contains the Subscriber Concealed Identity (SUCI). After the identity is resolved to Subscriber Permanent Identity (SUPI) as described, the fake base station 200 is configured to respond 260 with a suitable response that does not require integrity protection (see 4.4.4.2 Integrity checking of NAS signalling messages in the UE of 3GPP TS 24.501), with a Registration reject with a suitable cause code as explained in 5.5.1.2.5 Initial registration not accepted by the network of 3GPP TS 24.501, for example. Note that the Identity request (SUCI) may be sent without the integrity protection (4.4.4.2 Integrity checking of 3GPP TS 24.501), so the identity may be requested for each operation.

Figure 3:
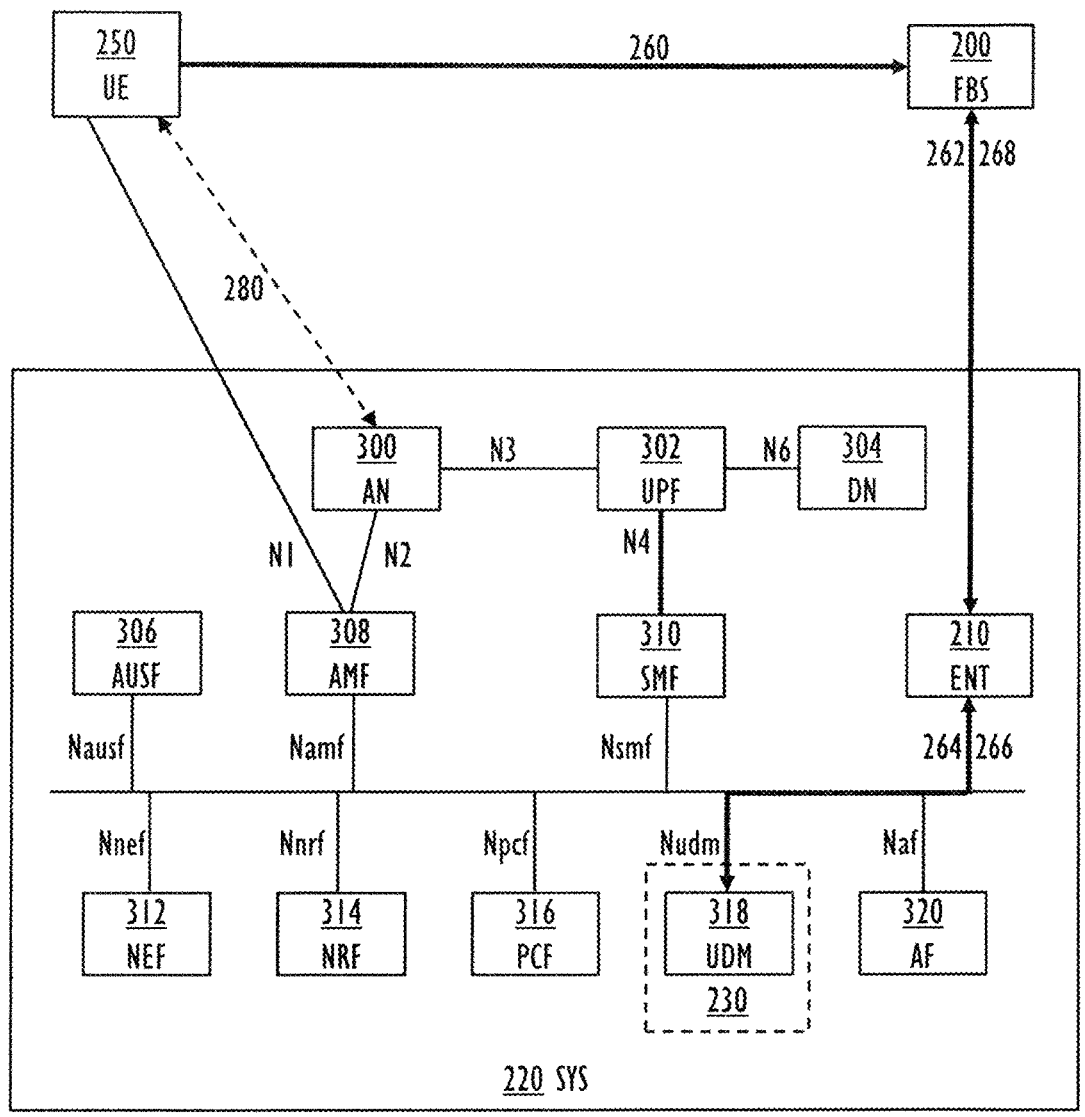
FIG. 3 illustrates example embodiments in a service-based core architecture of the mobile phone system.

In an example embodiment illustrated in FIG. 3, the system element 230, 318 belongs to a service-based core architecture of the mobile phone system 220.

FIG. 3 illustrates a (radio) access network (AN) 300, a user plane function (UPF) 302, and a data network (DN) 304, and also interfaces N1, N2, N3, N4 and N6.

In the service-based architecture, each network function (NF) offers a service based interface (SBI):
- Authentication server function (AUSF) 306 with Nausf-interface;
- Access & mobility management function (AMF) 308 with Namf-interface;
- Session management function (SMF) 310 with Nsmf-interface;
- Network exposure function (NEF) 312 with Nnef-interface;
- Network repository function (NRF) 314 with Nnrf-interface;
- Policy control function (PCF) 316 with Npcf-interface;
- Unified data management function (UDM) 318 with Nudm-interface; and
- Application function (AF) 320 with Naf-interface.

As shown in FIG. 3, the UDM function 318 may offer the required service as the network element 230 through the Nudm-interface, which is communicatively couplable with the entity 210. FIG. 3 illustrates the communication chain 262, 264, 266, 268 between the fake base station 200, the entity 210 and the network element 230, 318.

In an example embodiment, the UDM function 318 implements UDM subscriber identity deconcealing with which the unencrypted subscriber identity is obtained based on the the encrypted subscriber identity as described in 3GPP standards 3GPP TS 29.500 (3rd Generation Partnership Project; Technical Specification Group Core Network and Terminals; 5G System; Technical Realization of Service Based Architecture) and 3GPP TS 33.501 (3rd Generation Partnership Project; Technical Specification Group Services and System Aspects; Security architecture and procedures for 5G system), incorporated herein by reference in those jurisdictions where applicable. See especially chapter 6.1.3 Authentication procedures of 3GPP TS 33.501 for UDM subscriber identity deconcealing.

Figure 4:
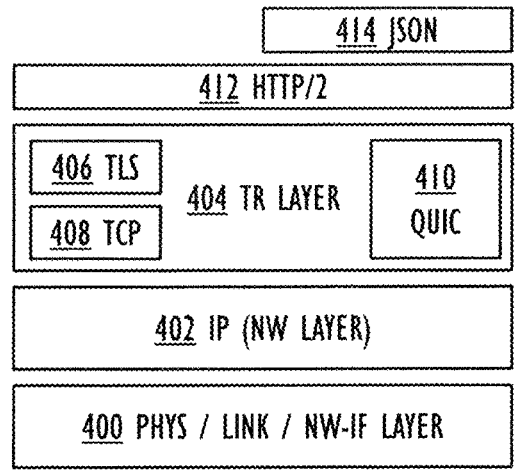
FIG. 4 illustrates example embodiments of a communication protocol.

In an example embodiment illustrated in FIG. 4, the communication protocol between the entity 210 and the network element 230, 318 may be implemented as follows:
- the physical/link/network interface layer 400 is implemented as required (in wired or wireless fashion);
- HTTP/2 (Hypertext Transfer Protocol) 412 is adopted as the application layer protocol for the service based interface;
- TCP (Transmission Control Protocol) 408 is adopted as the transport layer protocol 404;
- TLS (Transport Layer Security) 406 is adopted as the privacy and data integrity protocol;
- IP (Internet Protocol) 402 is adopted as the network layer protocol;

Use of QUIC (Quick UDP Internet Connections) 410, binary encoding (Concise Binary Object Representation CBOR, for example) may be implemented as required;

JSON (JavaScript Object Notation) 414 is adopted as the serialization protocol; and REST-style (Representational State Transfer) service design whenever possible and custom (RPC-based, Remote Procedure Call) methods otherwise.

In an example embodiment, the mobile phone system 220 comprises a fifth generation (5G) wireless system, although the example embodiments are not limited to such a system, but are applicable with other wireless systems possessing similar characteristics for the protection of the subscriber identity as well.

It will be obvious to a person skilled in the art that, as technology advances, the inventive concept can be implemented in various ways. The invention and its embodiments are not limited to the example embodiments described above but may vary within the scope of the claims.

The invention claimed is:

1. A method comprising:
capturing in a fake base station at least one wireless message that has been transmitted from a mobile subscriber apparatus interoperable with a mobile phone system;
detecting, by the fake base station, an encrypted subscriber identity from the at least one captured wireless message; and
retrieving, by the fake base station, an unencrypted subscriber identity from an entity inside an infrastructure of the mobile phone system based on the encrypted subscriber identity.

2. The method of claim 1, wherein the encrypted subscriber identity has been encrypted with a public-key cryptography.

3. The method of claim 2, wherein the entity communicates with a system element of the mobile phone system possessing a private key of the public-key cryptography for decrypting the encrypted subscriber identity.

4. The method of claim 3, wherein the system element belongs to a service-based core architecture of the mobile phone system.

5. The method of claim 1, wherein the encrypted subscriber identity comprises:
a Subscription Concealed Identifier.

6. The method of claim 1, wherein the unencrypted subscriber identity comprises:
a Subscription Permanent Identifier.

7. The method of claim 1, wherein the mobile phone system comprises:
a fifth generation wireless system.

8. The method of claim 1, wherein the fake base station communicates with the entity via an encrypted communication channel to retrieve the unencrypted subscriber identity.

9. The method of claim 1, wherein the entity is permitted to operate within the infrastructure of the mobile phone system to communicate with the fake base station to transmit the unencrypted subscriber identity to the fake base station.

10. An arrangement comprising:
a fake base station, and an entity inside an infrastructure of a mobile phone system, wherein:
the fake base station includes one or more processing units and one or more radio transceivers configured to capture at least one wireless message from a mobile subscriber apparatus, to detect an encrypted subscriber identity from the at least one captured wireless message, and to transmit the encrypted subscriber identity to the entity; and
the entity includes one or more processing units and one or more communication interfaces configured to receive the encrypted subscriber identity from the fake base station, to retrieve an unencrypted subscriber identity from a network element of the mobile phone system based on the encrypted subscriber identity, and to transmit the unencrypted subscriber identity to the fake base station.

11. The arrangement of claim 10, wherein the encrypted subscriber identity has been encrypted with a public-key cryptography.

12. The arrangement of claim 11, wherein the entity is configured to communicate with the system element of the mobile phone system possessing a private key of the public-key cryptography for decrypting the encrypted subscriber identity.

13. The arrangement of claim 12, wherein the system element belongs to a service-based core architecture of the mobile phone system.

14. The arrangement of claim 10, wherein the encrypted subscriber identity comprises:
a Subscription Concealed Identifier.

15. The arrangement of claim 10, wherein the unencrypted subscriber identity comprises:
a Subscription Permanent Identifier.

16. The arrangement of claim 10, wherein the mobile phone system comprises:
a fifth generation wireless system.

* * * * *